INVENTOR
Robert W. Pointer
BY Evans + McCoy
ATTORNEYS

April 17, 1956 R. W. POINTER 2,742,301
DEFORMABLE CUSHION SUSPENSION FOR VEHICLES
Filed Feb. 4, 1950 4 Sheets-Sheet 3

INVENTOR
Robert W. Pointer
BY Evans + McCoy
ATTORNEYS

April 17, 1956 — R. W. POINTER — 2,742,301
DEFORMABLE CUSHION SUSPENSION FOR VEHICLES
Filed Feb. 4, 1950 — 4 Sheets-Sheet 4

INVENTOR
Robert W. Pointer
BY Evans + Mc Ley
ATTORNEYS

United States Patent Office 2,742,301
Patented Apr. 17, 1956

2,742,301

DEFORMABLE CUSHION SUSPENSION FOR VEHICLES

Robert W. Pointer, Portland, Oreg., assignor to The General Tire and Rubber Company, Akron, Ohio, a corporation of Ohio Application February 4, 1950, Serial No. 142,428

40 Claims. (Cl. 280—104.5)

The present invention relates to pneumatic suspensions for motor vehicles, and more particularly to such suspension systems and structures employing inflatable cushions of rubber or the like. One of the principal objects of the invention is to provide a generally improved pneumatic suspension which is especially advantageous for use in heavy duty vehicles such as trucks, trailers, and semi-trailers. When the invention is employed in vehicles having tandem axles and wheels, numerous advantages are obtained, among which are smooth riding qualities, minimized transmission of vibration from wheels and axles to vehicle frame, the use of relatively low air pressure in the supporting inflation cushions, minimized lateral motion and side sway of the vehicle frame, and improved and simplified snubbing which reduces vehicle bounce.

Another object of the invention is to provide a vehicle suspension wherein a wheel axle is connected to the vehicle frame in such a manner that horizontal loads such as lateral and longitudinal loads, and loads on the axle resulting from braking of wheels carried by the axle, are transmitted to the frame through and substantially wholly by means of jointed rigid parts, the pneumatic cushion or cushions employed being substantially free of shear stresses and being compressed by braking action so as to provide a stabilizing settling of the vehicle frame on the running gear when brakes are applied. This aspect of the invention is embodied in a tandem wheel vehicle wherein the dual axles carry rigidly attached lever arms, such arms preferably extending forward from the axles and being resiliently connected at their formed ends to the frame structure so that all horizontal and braking loads are transmitted to the frame through such arms. As a preferential arrangement, and that which is illustrated in the accompanying drawings, an arm structure extends forwardly from each of the tandem axles. The arm structures are each of the wishbone type, the spread apart ends being rigidly secured to spaced points of the axle controlled thereby and the forward end being connected to bracket means depending from the frame structure. The connections for the forward ends include rubber cushions or bushings which permit limited twisting of the arms resulting from traverse of the vehicle over rough roads or terrain. The parallel axles are connected by rigid frame members constituting spaced, generally parallel walking beams. The connections of the frame members to the axles include cushioned or resilient joints which permit slight twisting or distortion of the rectangular running gear structure comprising the side frame members and the axles. Preferably the two side frame members of the running gear are disposed directly beneath and in parallel relation to the longitudinally extending beam members of the vehicle frame so as to receive elongated inflatable cushions therebetween. Such cushions, in the preferred arrangement, have a length at least substantially equivalent to the distance between the tandem axles. Inextensible vertical ties between the side frame members of the running gear and the vehicle frame control separation of the parts in operation, such ties being located at points intermediate the axles to permit teetering of the latter on the ends of the walking beam side frame members.

Another object, associated with the tandem wheel system mentioned, is concerned with the provision of means for easily lifting either the front or rear pair of wheels relative to the other for running on one pair only, as when the vehicle is light. This phase of the invention is also concerned with the provision of means whereby any one or two of the wheels of a tandem unit can be easily raised off the ground or roadway for the purpose of servicing such wheel or wheels, changing a tire, or for running with the wheel or wheels so raised, as in an emergency.

A further and more general object of the invention is to provide an improved cushion structure and unit assembly for pneumatic suspension systems, the cushion preferably being of the multiple cell type and the unit including a rigid member, preferably both top and bottom members bonded to the cushion for facile attachment to and removal from a vehicle.

A still further object is to provide in combination in a pneumatic suspension system, an elongated inflatable cushion and stabilizing means such as elongated bars disposed to bear against the cushion and relatively movable for distorting the cushion to a desired position or attitude between principal load bearing members of the suspension.

Other objects and advantages pertaining to certain novel features of construction and combinations and arrangements of parts providing simplicity in design and economy in manufacture are apparent in the following detailed description of a suitable embodiment of the invention. This description is made in connection with the accompanying drawings forming a part of the specification and in which like parts throughout the several views are indicated by the same letters and numerals of reference.

The principles and combinations of the present invention are embodied in several forms of running gear each of which is illustrated as though assembled on the rear end of a frame A of a vehicle such as a trailer or semi-trailer for use principally on surfaced or paved highways and streets. The frame comprises longitudinally extending side members 1 and 2 disposed in spaced parallel relation, and connecting cross members 3, 5 and 7. These frame members, formed of rolled steel channel section, are connected together as by welding. The front or leading end of the vehicle frame is conventionally supported and the running gear incorporating the present invention supports the rear end of the vehicle frame. Such running gear comprises tandem axles 8 and 9 on the ends of which wheels are rotatably mounted in conventional fashion. Wheels 10 and 11 comprising one or the leading pair are on axle 8, and wheels 12 and 13 comprising another or trailing pair are on axle 9.

At each side of the vehicle a pneumatic suspension unit B is interposed between one of the longitudinally extending vehicle frame members and the axles 8 and 9, the two pneumatic or cushion units thus being disposed in spaced generally parallel relation and serving to connect the axles 8 and 9 adjacent their ends to retain them in parallel relation.

The suspension units A each comprises an air cushion 15 of superimposed cells 16, 17 and 18. The individual cells are formed of rubber reinforced by cords 19. The use of a plurality of superimposed cells interconnected as by internal passages 20 in their common walls imparts desired characteristics of stability and strength to the cushion while obtaining the desired compactness and range of movement. Suitable metal sleeves or grommets may be inserted through the passages 20 during the building of the air cushions to insure that the passages remain open during the curing of the rubber and in use.

Extending along the top of the air cushion is a rigid attaching member 21 which may take the form of a rolled steel channel disposed with its flanges directed upwardly to embrace one of the vehicle frame side members, the web of the channel being bonded to the top of the uppermost cell 16 of the cushion 15. The bottom of the lower cushion cell 18 is bonded to the top surface of a rigid hollow metal side frame member 22 which extends between and is connected at or adjacent its ends to the axles 8 and 9. This hollow member, which may be made of welded together steel plates, is pneumatically sealed, providing an air chamber 23 in communication with the interior of the air cushion 15 through a plurality of passages 24 formed as by aligned openings in the lower wall of the bottom cell 18 of the air cushion and the top wall of the hollow member or air box 22.

Control of the flow of air or other pneumatic fluid through the passages 24, there being three or more such passages in each of the suspension units B, is effected by one way or check valves that may be conventional or, as shown, may take the form of molded rubber element 25 tubular at one end and flattened at the other to provide a self collapsing closure, as indicated at 26. The tubular end of the element is formed with an outwardly directed radial flange received in a counterbore of a metal plug 27 threaded into the opening in the top of the hollow member 22. A ring 28 threaded into the counterbore in the plug 27 engages the flange of the molded rubber valve element to hold the latter in place.

When the pressure of the pneumatic fluid in the air cushion 15 exceeds that in the chamber 23 of the air box, the fluid flows into the latter through the tubular rubber element 25, the mouth or outlet 26 of the latter expanding to accommodate the flow. Reverse flow of pneumatic fluid from the air box chamber 23 into the expansible cushion 15 is prevented or at least restricted through the self closing resilient mouth 26 of the valve element so that pneumatic fluid returns to the cushion 15 from the air box chamber 23 at a relatively slow and restricted rate as through a small opening 29 formed in the wall of the valve element. Access to the interior of the air chamber 23 as for installing, inspecting and repairing the check valve elements 25, is through threaded openings in depending bosses 30 normally closed by metal screw plugs 31.

Adjacent their ends the side frame members 22 are formed with semicylindrical transverse recesses 33 which receive the axles 8 and 9, the axles being clamped in the recesses as by cast or forged metal caps 35 having flanges 36 bolted to reinforcing plates 37 welded to the bottoms of the side frame members. The caps are reinforced with longitudinal ribs and are each formed with a semicylindrical recess matching the companion recess in the frame member. Resilient rubber bushings 34 are interposed in the annular space between the recess and cap walls and the axles, the bushings being split longitudinally to facilitate assembly about the axles. Integral circumferential flanges on the ends of the rubber bushings overlie the sides of the frame members and the caps 35, the bushings being located on the axles by arcuate or segmental plates 32 welded to the axles. These plates engage the ends of the bushings to confine the latter and prevent extrusion and displacement thereof under extreme pressures. The pair of tandem axles 8 and 9 and the pair of spaced side frame members 22 of the suspension units thus comprise a resiliently connected rectangular running gear frame, the resilient bushings 34 permitting limited twisting and distorting of such frame during travel of the vehicle.

Each of the cells 16, 17 and 18 comprising one of the air cushions is, in the normal inflation condition of the air cushion, several times greater in width than in height and several times greater in length than in width. The total height of the air cushion is preferably less than its width, the length of the air cushion being several times both the width and the height thereof. These dimensional characteristics minimize lateral motion of the cells under load and the relatively great length of the cushion, which is at least as long as the distance between the tandem axles and preferably longer than such distance, as illustrated, permits the use of relatively low pneumatic pressures.

Figure 5:
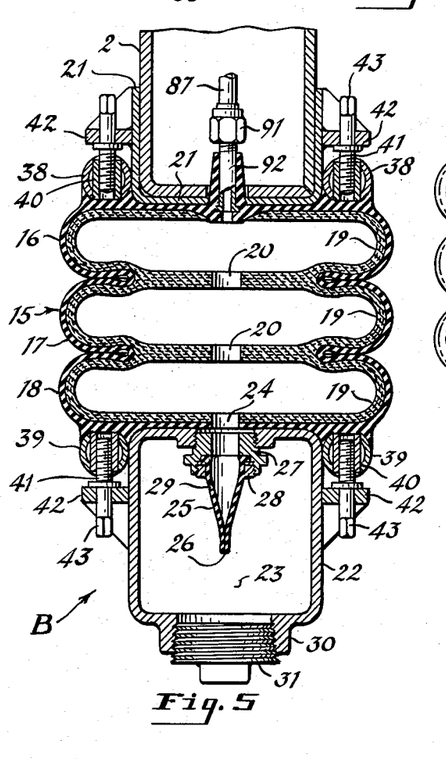
Fig. 5 is a sectional detail taken transversely through one of the air cushions substantially along the line indicated at 5—5 of Fig. 2 and enlarged with respect to that figure.

In making the air cushions 15 the several cells are first separately built up or assembled as by wrapping cord reinforcing material about seamless rubber tubing or liner material. The aligned through openings 20 are then formed and suitably sleeved or grommeted. Thereafter the several cells are brought together in superposed relation and covered by gum rubber stock. Curing may be effected in open steam although the use of a heated mold is preferred. The rigid top member 21 and the rigid air box 22 are bonded to the cushion during vulcanization and, if a metal mold is used, are supported in place by the mold during the molding operation. Although the stabilizing bars 38 and 39 may be assembled in the suspension units after the curing of the rubber, it is preferred to include the stabilizing bars in the assembly that is bonded together by the molding operation so that they become permanently attached to the top and bottom faces of the cushions. As shown in Fig. 5, sufficient gum rubber stock is built up along the top and bottom cells of the cushion and about the stabilizing bars to fill the intervening spaces and to provide relatively large areas of contact between each bar and the cushion.

As shown in Fig. 5 the width of the web or attaching portion of the top rigid member or channel 21 and also the width of the upper face of the side frame member 22, each is less than the width of the air cushion 15. The rigid parts are bonded by vulcanization to the central portions of the air cushion so that stabilizing bars or rods 38 and 39, disposed along the sides of the rigid members in parallel relation thereto and to the cushion, are engageable with the top and bottom cells 16 and 18, respectively, providing supplemental bearing and supporting surfaces. The stabilizing bars may take the form of circular sectioned rods or hollow pipes fitted with threaded plugs 40 that receive collared screw studs 41 guided in drill holes or sockets formed in lateral brackets 42 welded or otherwise secured to upstanding flanges of the top rigid channels 21 and to the sides of the hollow frame members 22. The collars on the studs 41 bear against the brackets 42 thus transmitting the load or pressure from the pneumatic cushion to the appropriate rigid member of the suspension unit. The stabilizing rods 38 and 39 at each side of the suspension unit are adjusted toward and away from one another as by being turned with wrenches applied to square ends 43 of the studs.

Figure 6:
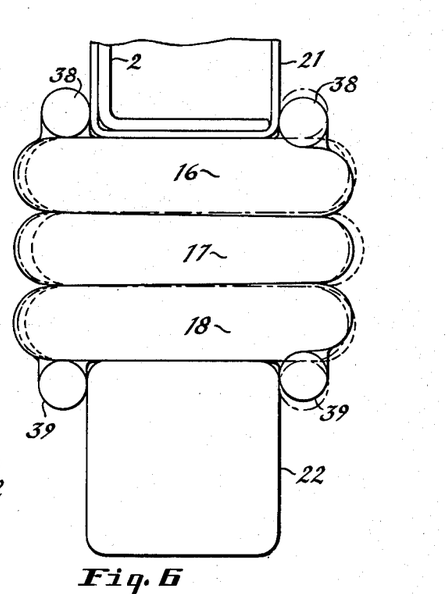
Fig. 6 is a diagrammatic illustration of the pneumatic cushion unit, similar to Fig. 5, showing the action of the adjustable stabilizing bars in centering the cushion between the top and bottom pressure plates or attachment members.
Figure 7:
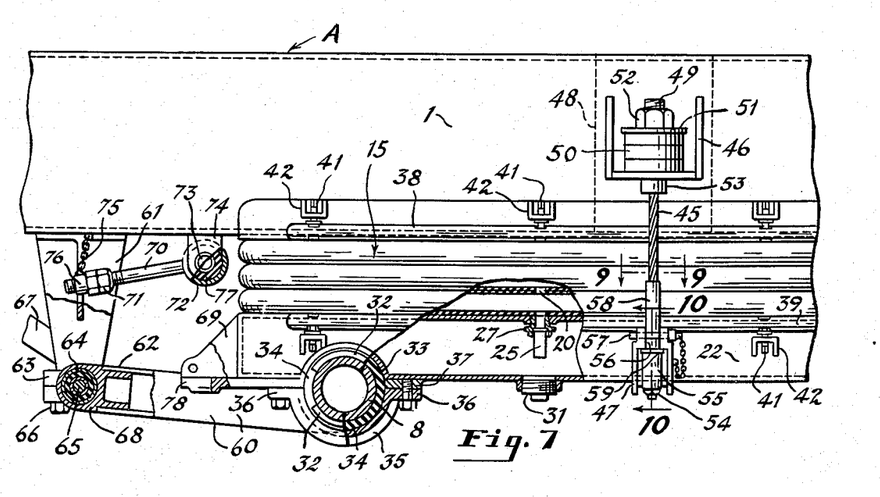
Fig. 7 is a fragmentary elevational view of a portion of a modified form of the suspension, parts being broken away and parts being removed.

Since the stabilizing bars can be independently adjusted vertically, they provide a convenient means for applying distorting pressure to the air cushion so as properly to center the latter between the pressure members 21 and 22 of the suspension unit. It sometimes occurs that a multicell air cushion of the type herein contemplated becomes distorted and shifts laterally when subjected to load, the cushion taking or assuming a position such as that illustrated, for example, by the short dash broken lines of Fig. 6. The normal molded or unstressed shape of the cushion is indicated by the long dash broken lines of the same figure. When such a condition is encountered in one of the present suspension units, correction is readily effected by moving a cooperating pair of the stabilizing bars 38 and 39, such as the pair on the right hand side of the unit, relatively toward one another as from the broken line to the full line positions of Fig. 6. Such movement or relative movement of the right hand stabilizing bars has the effect of pinching or squeezing together the right hand portions of the superposed air cells, thereby shifting all of the cells relatively to the left as to the corrected or aligned positions indicated by the full lines of that figure.

Figures 8, 9, 10:
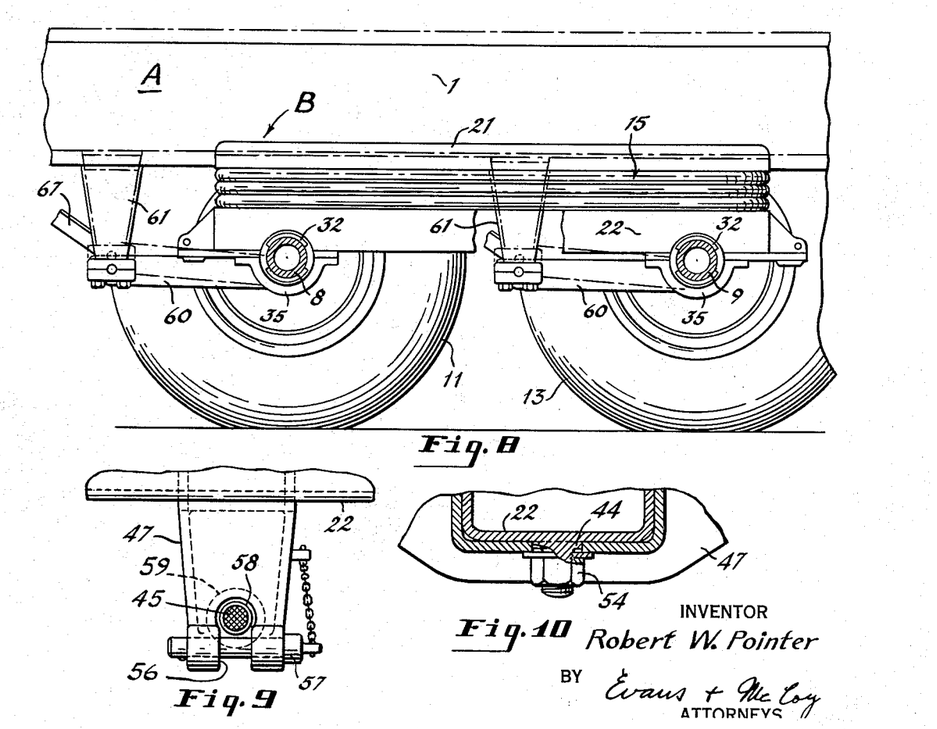
Fig. 8 is a side elevational view of the suspension, partly diagrammatic, illustrating the action under loads imposed during braking through the wheels.
Fig. 9 is a horizontal sectional detail taken substantially along the line indicated at 9—9 of Fig. 7 and enlarged with respect to that figure.
Fig. 10 is a fragmentary sectional detail taken substantially along the line indicated at 10—10 of Fig. 7 and enlarged with respect to that figure.

At points intermediate the tandem axles 8 and 9, the side frame members 22 of the suspension units are each connected to the vehicle frame by suitable means for positively limiting the amount of separation which may occur between the vehicle frame and the side frame members upon rebound. The separation resisting or tieing means for each of the suspension units comprises flexible inextensible elements 45 such as steel cables disposed in spaced parallel relation one on each side of the cushion 15. The ties all extend vertically between lateral brackets 46 carried by the vehicle frame members 1 and 2 and saddle members 47 extending underneath the side frame members 22 of the suspension units. The upper brackets 46 of each unit are oppositely directed and are secured, as by welding, one to the web of the side frame member of the frame and the other to a metal plate 48, the latter being disposed across the open face of the side frame member and welded to the edges of the flanges thereof to form a box section. The saddles 47 embrace the bottoms of the suspension side members, as shown in Fig. 10, and are formed with apertures to receive bosses 44 welded on the undersides of the frame members. These locating bosses resist longitudinal shifting of the saddles and are fitted with projecting studs that receive large washers and nuts 54 to hold the saddles in place.

Solid metal elements 49 are swaged or otherwise secured on the upper ends of the cable elements 45, the cables and end elements being received through openings in the brackets 46. Loads on the cables are transmitted to the brackets through a plurality of apertured rubber compression discs 50 that surround the elements 49. Pressure plates or washers 51 bear against the topmost rubber discs and adjusting nuts 52 are threaded onto the cable end elements 49 for tightening against the washers 51. Integral enlargements 53 on the lower ends of the threaded elements 49 provide shoulders that seat against the underside of the brackets 46 to locate the inextensible elements in assembly and to permit preloading of the rubber discs 50.

The saddle ends are formed with open ended slots 56 permitting assembly of the cushion units by movement of tie bottom ends 55 laterally into such slots. The ends 55 are swaged on the lower ends of the cable ties 45 providing shoulders that engage against the undersides of the ends of the saddle 47. The tie ends are retained in the slots as by removable cross pins 57 received through aligned apertures in the bifurcated saddle ends. The retaining pins are held captive to the saddles by flexible chains and are fitted with spring pressed detents to prevent them from sliding axially out of the apertures. Protective sleeves 58, of fiber, metal or other abrasion resistant material, are received about the inextensible tie cables 45 above the swaged-on ends 55. Split metal washers 59, faced with hard rubber or other antirattle material, are received about the cable ties and interposed between the lower ends of the cable ties and the saddle members 47.

Location of the ties 45 intermediate, preferably midway between the fore and aft tandem axles, permits relative up and down movement of the axles, the side members 22 of the suspension units performing a teetering or seesawing movement under the restraint of the inextensible ties. This action occurs, for example, when the vehicle travels across a localized obstruction such as a stone or brick in the roadway, the cells of the cushion 15 being first relatively compressed at one end and expanded at the other end and then relatively expanded at one end and compressed at such other end. In riding over obstructions or irregularities in a road or highway, the side frame members 22 of the suspension units may move bodily toward and away from the frame members of the vehicle, the flexible tie cables or elements permitting such bodily movement under the resilient action of the air cushions. The rebound or recovery is limited and controlled by the cable 45. Disposition of the inextensible cables 45 in symmetric relation on opposite sides of the air cushions has the effect of balancing the forces imparted to the side frame members 22 on rebound so that twisting of the latter on the axles is avoided. This feature is of particular merit in view of the use, in the suspension combination, of resilient connections between the side frame members 22 and the axles as provided by the rubber bushings 34. The symmetric arrangement of the ties of the present suspension system avoids objectionable twisting of the side frames and the imposition of objectionable distorting forces to the resilient sleeves 34.

In the present suspension system, horizontal forces including those of draft and side thrust are transferred between the axles and the vehicle frame through pairs of arms 60 secured to the axles at relatively widely spaced points. The arms of each pair extend forwardly from the axles and converge toward one another, the arms being connected at their forward ends to the lower ends of brackets 61 depending from the vehicle frame. The arms 60 are each built up as by welding together rolled steel channels and plates, forward ends 62 of the arms of each pair being disposed against one another and received over a common fitting 68 received between spaced portions 63 of the bifurcated lower ends of the brackets 61. A metal sleeved cylindrical rubber bushing 64 is press fitted in a horizontal cylindrical bore in the end fitting 68. The bracket ends 63 are split to receive the ends of through pins 65 embraced by the rubber bushings 64. Screws 66 tighten the split ends 63 about the pin ends.

The depending bracket arms 61 welded or otherwise secured to the undersides of the vehicle frame cross members 3 and 5 are reinforced by diagonal struts 67 which extend obliquely from adjacent the lower ends 63 of the bracket arms to auxiliary cross members 79 secured between the side members 1 and 2 of the vehicle frame. The draft arms 60 are generally horizontal when the vehicle is at rest, the longitudinal or turning axes of the axles 8 and 9 and of the pins 65 being parallel and substantially at the same level. During travel of the vehicle over rough terrain the axles 8 and 9 swing up and down over relatively short arcuate paths about the horizontal longitudinal axes of their respective bushing pins 65. This movement of the axles relative to the vehicle frame is damped by the resiliency of the bushings 64, these bushings also permitting limited twisting of the arms 60 as the opposite ends of the axles move vertically relative to one another. Distortion of the suspension structure caused by rising and falling of the axles relative to the vehicle frame is absorbed in the rubber sleeves or bushings 34 embracing the axles and the rubber bushings 64 at the forward ends of the draft arms.

For inflating and deflating the cushions 15 the vehicle or, in the case of a trailer, the towing tractor is preferably equipped with a pump or other means conventionally driven for supplying high pressure air as desired. Such air supply means is connected as by a conduit 82 to a supply tank 83 carried by the vehicle or trailer. In certain installations it is feasible to dispense with the pump and to fill the supply tank periodically through service station facilities.

The supply tank 83 is connected through a tubular conduit 84 of steel or other suitable metal to a conventional three-way valve 85 which may be manually operated. One of the valve outlet ports is connected by conduit 86 and branch conduits 87 to the air cushions 15 of the system. A pressure gauge 88 is connected to the conduit 86 by a tube 89. Preferably both the control valve 85 and the pressure gauge 88, the latter indicating the pressure in the air cushions, are located for operation and inspection, respectively, in the driver's cab of the vehicle on which the suspension system is used. In the case of a trailer, however, these components may be located either in the cab of the towing tractor or mounted directly on the trailer. When the valve 85 is turned or adjusted to exhaust air from the system or cushions, such air is released to the atmosphere through an outlet 90.

Branch conduits 87 are connected by removable fittings 91 to rubber cased valve stems 92 secured to and connected through the top walls of the air cushions so that air forced therethrough and into the cushions under pressure flows first into the upper cells 16 and thence sequentially into the other cells through the connecting apertures 20. As shown in Fig. 5 the inflation stem 92 of each air cushion extends through apertures provided in the web portion of the upper rigid member 21 and in the bottom flange of the vehicle side frame member.

Figure 3:
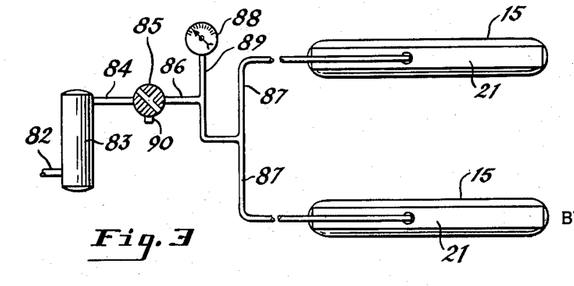
Fig. 3 is a diagram illustrating the pneumatic fluid or air connections and conduits between the pneumatic cushions of the suspension system and the air supply tank, together with a control valve and pressure gauge.
Figure 4:
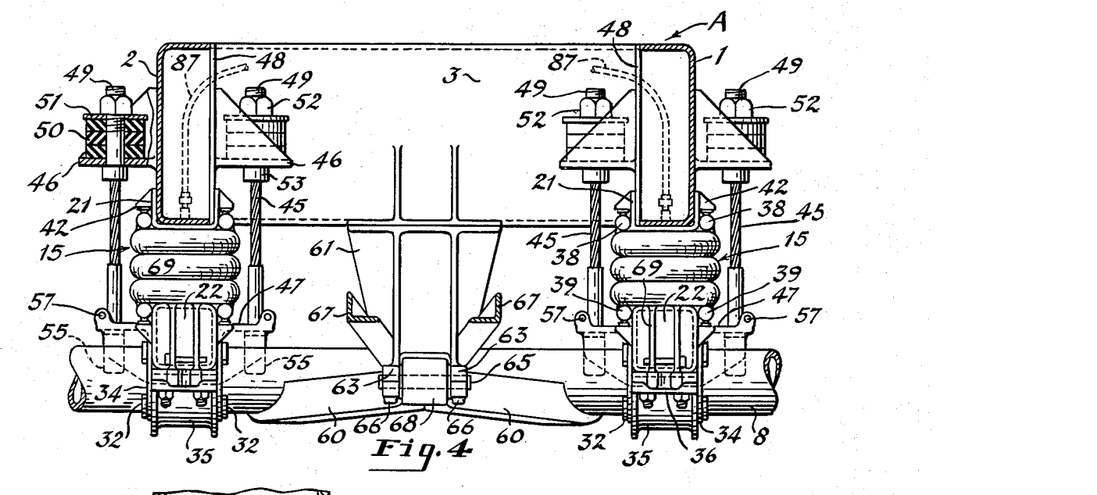
Fig. 4 is a sectional detail with parts removed, taken transversely through the vehicle frame in advance of the running gear, this view being taken substantially along the line indicated at 4—4 of Fig. 2 and enlarged with respect to that figure.

In the operation of a vehicle equipped with the present suspension system the valve 85 is adjusted or opened momentarily to admit high pressure air from the tank 83 into the air cushions 15 for the purpose of inflating the latter to whatever pressure is required to sustain the load to be carried by the vehicle. Thereafter the valve is closed and remains so until additional air or fluid pressure is required in the cushions or it becomes necessary to release air from the cushions. For ordinary travel over paved highways the cushions are inflated until the ties 45 are fully extended, preferably under slight tension. The gauge 88 is calibrated in pounds so that the operator may employ a chart in selecting the pressure to which the cushions are to be inflated for any given load, or the gauge may be calibrated directly in accordance with loads to be carried. In the position illustrated in Fig. 3 the valve 85 is turned to close the connection between the supply tank 83 and the conduits leading to the air cushions so that a constant quantity of air is trapped in the suspension units. The valve may also be turned to exhaust or release air from the suspension units through the valve outlet 90 for the purpose of reducing the pressure therein. This pressure reduction is resorted to, for example, when the vehicle load is lightened or when it is desired to lower the vehicle frame as when passing under low clearance bridges, viaducts, etc.

The ease and convenience with which the vehicle frame can be raised and lowered through inflation and deflation of the air cushions 15 makes the present suspension system of particular utility when it is desired to raise one or two of the wheels off the road or ground for the purpose of servicing such wheel or for running the vehicle on a reduced number of wheels.

In a modified version of the suspension system of the present invention, provision is made for optionally raising any one or two of the wheels relative to the others so that for a limited period of time the vehicle weight may be supported by such others. Adjustment of this character is effected by tying one of the ends of one or both of the suspension units B to the vehicle frame A in such a manner that, upon inflation of the corresponding cushion or cushions 15, the other end or ends of the suspension unit or units is forced to separate from and support the vehicle frame.

At the ends of the hollow side frame members 22, see Figs. 7 and 11 through 13, the reinforcing plates 37 are extended fore and aft and slotted to receive the lower ends of tie links 70. Preferably, the plates are reinforced as by a pair of spaced, welded in place vertical plates 69. The lower ends of the links are threaded to receive adjusting nuts 71 which may be engaged under the ends of the plates 37. At their upper ends the links 70 are formed with eyes 72. These eyes compressively receive cylindrical rubber bushings 77 carried on pins 73 supported below the vehicle side frame members by bracket members 74. During normal operation of the vehicle, when all four wheels of the tandem suspension system are functioning, the tie rods 70 are held in raised or inactive retracted positions by chains 75 suspended from the vehicle frame. Rings 76 on the chains are received over the link ends.

Figures 12, 13, 14:
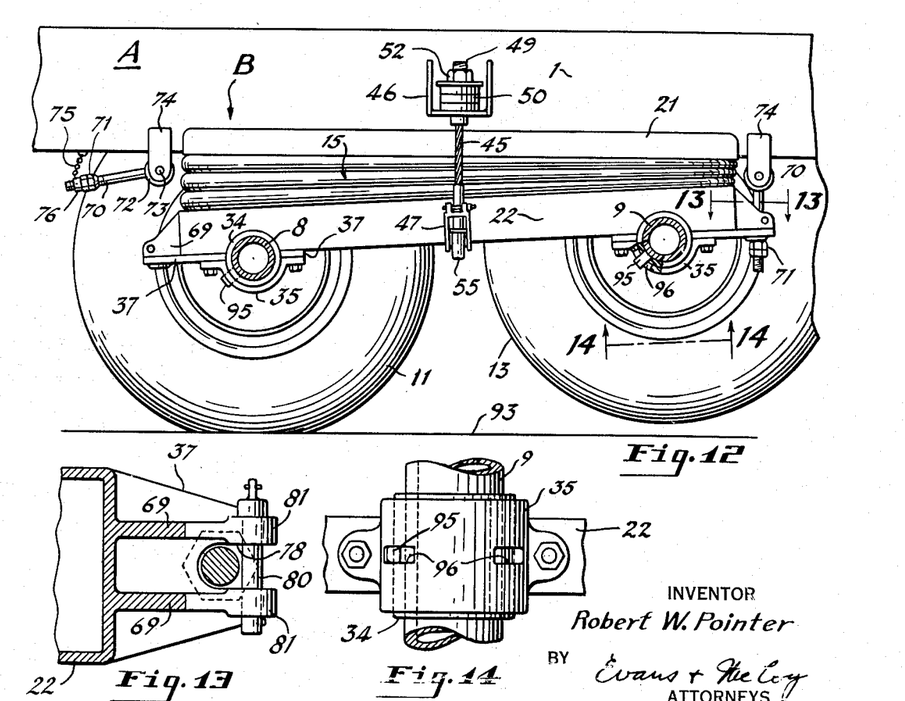
Fig. 12 is another side elevational view of the modified suspension in which the torque and shear resisting arms are eliminated, this view being similar to Fig. 11 and showing a pair of wheels of the running gear and their connecting axle raised so that the vehicle is supported on the other axle and wheel pair of the modified suspension, the near wheels being removed in this view for clarity.
Fig. 13 is a horizontal sectional detail taken substantially along the line indicated at 13—13 of Fig. 12 and enlarged with respect to that figure.
Fig. 14 is a fragmentary detail taken substantially along the line indicated at 14—14 of Fig. 12 and enlarged with respect to that figure to show one of the torque lugs on the axles.

As shown in Fig. 13 the ends of the extended plates 37 are bifurcated, providing slots 78 into and out of which the tie links 70 can be swung as desired. Retaining pins 80 are removably received through aligned openings in bosses 81 formed on the reinforcing plates 69. These pins extend across the slots 78 to prevent movement of the links out of the latter when the suspension system is being used with certain of the links engaged to hold one or more ends of the side frame members in retracted positions closely coupled to the vehicle frame.

Figure 1:
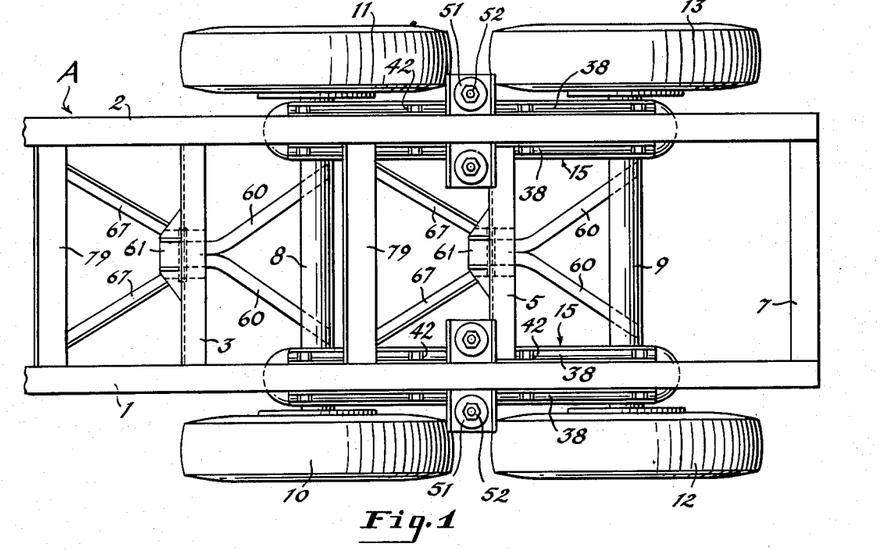
Figure 1 is a fragmentary top or plan view, with parts removed, of the rear end of the frame of a wheeled road vehicle such as a trailer or semi-trailer of the type customarily towed by a truck or truck-tractor, the vehicle being equipped with the suspension system of the present invention.
Figure 2:
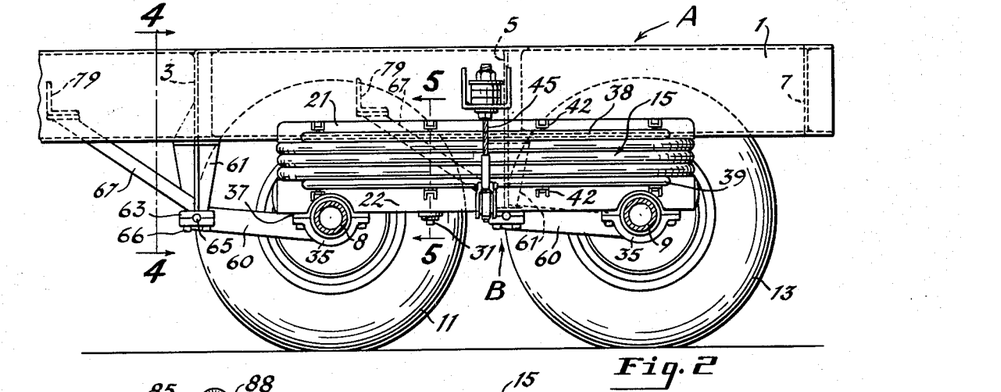
Fig. 2 is a side elevational view, partly in section and with parts broken away and removed, of the end of the vehicle of Fig. 1 showing the running gear and suspension.
Figure 11:
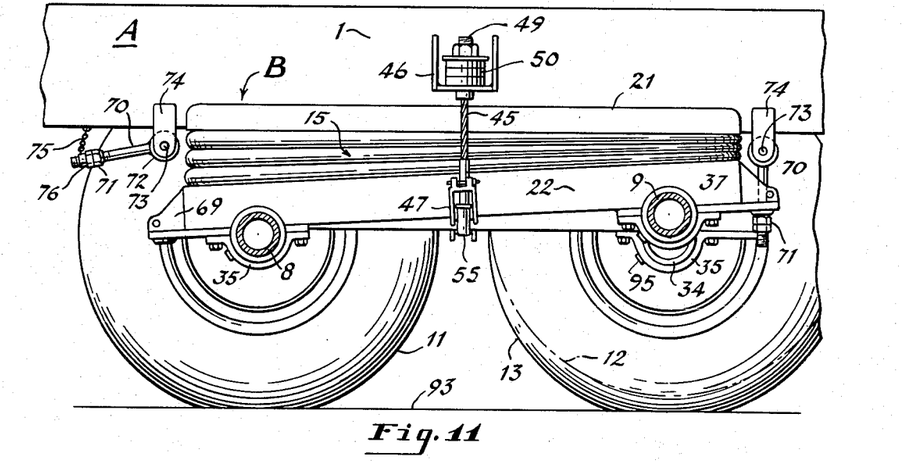
Fig. 11 is a side elevational view of the modified suspension, partly diagrammatic, showing one wheel raised for service or repair purposes, the near wheels of the running gear being removed in this view for clarity.

Fig. 11 illustrates the manner in which, in the modified version of the suspension, one of the wheels as, for example, the wheel 12 indicated by the broken lines, is raised above or off ground level 93. In this view, as in Figs. 2, 8 and 12, the near wheels 10 and 11 are removed from the suspension to show the other components. The broken line shows the position of the removed wheel. When it is desired to so raise one of the wheels, the cushions of the suspension units are first exhausted by turning the control valve 85 so as to connect the conduits 87 and 86 to the valve outlet 90. The weight of the vehicle compresses the cushions 15 to flatten or collapse the latter. While the cushions are so collapsed, the tie link 70 adjacent the particular wheel that is to be raised, for example the right hand link 70 suspended from the vehicle frame member 1 as viewed in Fig. 11, is released from its supporting chain 75 and lowered to the vertical position illustrated, in which it is received in the bifurcated end of the extended reinforcing plate 37. The retaining pin 80 is then inserted through the aligned apertures in the bracket bosses 81 to lock the link in the slot. The nuts 71 are adjusted as required to seat the uppermost nut against the underside of the bracket. Desirably, such uppermost nut is formed with a convex top face or dome which is locatingly and retentively received in a matching concavity formed in a boss on the underside of the extension bracket. Thereafter the control valve 85 is turned or adjusted to admit high pressure pneumatic fluid or air into the cushions 15 to inflate the latter and to raise the vehicle frame by forcing the upper rigid members 21 of the suspension units relatively away from the side frame members 22. Inasmuch as the right hand end of the near side frame member 22, as viewed in Fig. 11, is tied to the vehicle frame by the connected link 70 relative separation of the suspension components is limited adjacent such link. Thus, as the inflation of the cushions 15 proceeds, the wheel 12 is raised above the ground level 93 to the desired elevated position indicated by the broken lines.

In Fig. 12 is illustrated an arrangement in which wheels 12 and 13, both carried by rear axle 9 of the modified tandem unit, are raised above the ground level 93 by a procedure similar to the single wheel procedure just described in connection with Fig. 11. To raise the rear axle 9 the cushions 15 are first deflated, the rear ties 70 from both vehicle frame members 1 and 2 are lowered and secured in their respective receiving brackets, and the cushions then reinflated. This action separates the forward ends of the hollow side frame members 22 from the vehicle frame, thereby supporting the vehicle on the front wheels 10 and 11 carried by the front axle 8, the rear axle being relatively elevated to lift the wheels 12 and 13. In Fig. 12, as previously mentioned, the near wheels 10 and 12 have been removed for clarity to show the near suspension unit.

It is feasible to operate the vehicle with either axle and wheel pair elevated or raised off the road surface when traveling light on a paved highway. Thus the vehicle may be operated to advantage while supported on the wheels of only one of the tandem pairs of axles. It is understood, of course, that in raising the front axle 8 it is necessary to connect the front ties instead of the rear ties. It is also feasible, as in an emergency, to operate with diagonally disposed tires raised off the road or highway such as the tires 11 and 12 or the tires 10 and 13.

When the vehicle is traveling along a highway or road and one of the wheels encounters a bump or obstruction, riding over the latter, the appropriate cushion 15 is partially collapsed to accommodate the raising of the wheel and axle caused by the ride over the bump. This collapsing of the cushion increases the pressure of the air or other pneumatic fluid therein, forcing a portion thereof through the passages 24 and check valves 25 into the constant volume chamber 23 of the air box or side frame member 22. After passing the obstruction or bump, return of the partially collapsed air cushion to normal is retarded by the partial entrapment of the air in the chamber 23, the valves 25 restricting the return of air through the passages 24. Thus a snubbing and leveling effect is provided which promotes a smooth ride relatively free from objectionable bouncing and roller-coastering.

The wheels of the present running gear may be equipped with conventional hydraulic or mechanical brakes, the suspension system described being adapted to absorb braking loads without disturbing stability and without objectionably interfering with the cushioning function. The action of the suspension system in absorbing braking loads is illustrated diagrammatically in Fig. 8, the near wheels 10 and 12 having been removed for clarity as previously mentioned. Upon the application of braking forces to the wheels, tending to retard the vehicle in its forward motion or to the left as viewed in that figure, a torque is applied by the brakes to one or both of the axles 8 and 9 which support the brake assemblies, this torque tending to rotate the axle or axles counterclockwise. The rubber bushings 34 permit limited turning of the axles in their retaining journals so that the braking torque or torques are substantially wholly restrained by the forwardly extending arms 60. The ends of such arms, being connected to the bracket members 61 depending from the vehicle frame, exert a downward force or pull on the frame which increases the load on the air cushions 15. This increased load on the air cushions, in those instances in which the braking action is substantially uniform as between the wheels on the two axles, results in a substantially uniform compression or partial collapse of the cushions as from the broken line positions of Fig. 8 to the full line positions of that figure. Thus in the application of a braking load to the suspension system of the present invention, there is a downward settling movement of the vehicle frame on the axles which tends to increase stability and roadability of the vehicle.

By reason of the tension maintained in the cable links which form the ties 45, the saddles 47 constitute fulcrum points for rocking movements of the axle carrying beams which constitute the rigid side frame members 22. Whenever a wheel passes over a bump or into a depression, it may raise or lower one end of a beam member 22 and thus rock the beam about this fulcrum point as a pivotal axis to distort the air cushion 15 momentarily to the same general configuration shown in Figure 11. Thus the beams 22 have a rocking action of the walking beam type; but the present arrangement is superior to a conventional walking beam suspension in a number of important respects. The usual trunnion bearings are eliminated and the load is distributed for a considerable distance along the frame. This eliminates the use of heavy brackets and the resulting concentration of stresses, and allows the use of a lighter frame for the vehicle. Also, much greater flexibility is provided by the present arrangement, inasmuch as the flexible cable links 45 permit movement of the fulcrum axis in all directions relative to the vehicle frame except downward or separative beyond a predetermined limit. Such movements, however, are inherently restrained movements which produce automatic restoring forces tending to return the saddle 47 to a position perpendicularly beneath the brackets 46. This restoring force results from compression of the cushion 15 whenever the cable links 45 are deflected out of their normal perpendicular positions. Hence, with certain types of vehicles, the cable links 45 are capable of exerting sufficiently strong restoring forces in both longitudinal and lateral directions to make the use of radius arms unnecessary for holding the beams 22 in parallel alignment under the frame members 1.

Thus it is to be noted that, although for most applications the present running gear or suspension system employs lever type torque resisting components such as the arms 60 and the brackets 61 to carry horizontal forces, it is also feasible, as illustrated in Figs. 11 and 12, to eliminate the relatively rigid radius rod or wishbone torque arm connections between the axles and the vehicle frame. In such a modification the cushions 15 and the ties 45 carry horizontal as well as vertical forces. Such a suspension system is of particular utility in quick detachable units designed for moving relatively light loads.

In the modification of Figs. 11 through 14, in which the torque arms 60 are eliminated and horizontal forces are taken by the remaining components of the system, provision is made for resisting excessive turning of the axles 8 and 9. Adjacent each end of each of the axles is secured, as by welding, a radially projecting knob or lug 95. These lugs extend through openings or apertures provided therefor in the rubber bushings and through circumferentially elongated openings or slots 96 in the journal caps 35. Fig. 14 shows the arrangement of the lug 95 and associated torque resisting parts for or adjacent one of the wheels, it being understood that the lug arrangement is similar at each of the points of connection of the axles and the walking beams 22. The clearances between the lugs 95 and the ends of the slots 96 permit limited turning of the shafts relative to the side members or walking beams. This limited turning of the shafts enables the suspension to twist or distort in operation by yielding action of the rubber bushings.

Severe torque stresses on the axles turn the latter so as to move the lugs 95 into the ends of the slots 96, in which position of the parts further rotating or turning of the shafts relative to the side members is prevented by the reaction between the lugs and the caps 35. The positive interlocking connection thus provided between the axles and side members of the suspension permits the use of axle mounted brakes without external torque resisting devices such as radius rods or lever arms. If desired, however, the lugs 95 can be used in addition to the torque arms 60 as a safety measure, as well as in lieu thereof, since the several torque resisting arrangements disclosed are not mutually exclusive of one another.

The interlocking of the axle lugs 95 in the cap slots 96 resists relative axial shifting of the shafts in the caps so that, for operation under conditions of relatively light loading, it is feasible, as shown in Figs. 11 and 12, to eliminate the segmental plates 32 described in connection with the preceding figures.

Although each axle is thus equipped with one lug at or adjacent each end, it is preferable, as shown in Fig. 14, to form the circumferentially elongated slots 96 in pairs in each of the caps 35 so that the caps may be reversed, if desired. This arrangement also permits optional location of the axle lug in either one of the two slots in assembly.

In the so-called flexible suspension of Figs. 11 and 12, wherein the rigid torque and shear resisting arms 60 are eliminated, an important self-steering feature is present which is particularly advanageous for use where numerous curves are encountered. This self-steering of the suspension unit reduces objectionable scuffing of the tires on curves, minimizing wear.

Adjustment of the air pressure in the pneumatic cushions 15 enables the present suspension to accomplish a number of new functions. For example, the vehicle may be driven under a waiting load with the cushions 15 deflated, and then, when the cushions are inflated, the bed of the vehicle will pick up the load. Similarly, in unloading the vehicle, the cushions 15 may be deflated to lower the load on suitable supports leaving the vehicle free to be moved out from under its load. To obtain greater vertical movement for such purposes, for other lifting purposes, or for the purpose of leveling the bed of the vehicle with a loading platform, the cables 45 may be disconnected from the saddles 47 and the vehicle bed temporarily elevated above its normal height. This is accomplished by first reducing the pressure in cushions 15 to slacken the cables 45, removing the bottom ends 55 from slots 56, and then reexpanding the cushions to the desired height.

When the cables 45 are slack, or disconnected from the saddles 47, the air pressure in the cushions 15 gives a load indication on the pressure gauge 88 to provide a self-contained scales for the vehicle. This feature is of great advantage in the trucking industry where it is desired to load the vehicle up to the limit allowed by law without danger of incurring a penalty for overloading. For such use the gauge dial or face is suitably calibrated to read directly either the net or gross load in pounds carried by the suspension system.

The pressure gauge 88 also serves as a shock indicator. When fragile merchandise is being transported over rough roads or streets, the degree and character of the vibratory deflection of the pointer in the gauge indicates the degree of shock being transmitted to the load. The driver of a tractor vehicle is thus able to keep himself informed of the degree of shock imposed on the trailer vehicle under different conditions of loading.

Another important advantage of the present suspension over conventional spring suspensions is that it provides a long spring stroke for light loads. Ordinarily, when a heavy vehicle with conventional steel springs is running with a light load, it is subject to extremely severe vibration because the stiff springs are not deflected appreciably and have practically no resilience without the weight of the load imposed thereon. The use of conventional underload springs alleviates the situation to some extent, but necessarily shortens the spring stroke to a small fraction of the intended spring stroke for the vehicle under normal load. By properly adjusting the pressure in the present pneumatic cushions 15, these cushions provide substantially the same spring stroke and hence the same quality of ride under all conditions of loading. In effect, the cushions may be changed to suit the load each time the weight of the load is altered.

Another inherent advantage of the present construction is that the frame and body of the vehicle may be carried lower in relation to the wheels than in a conventional suspension system because it is not necessary to provide for the vehicle frame to settle under full load or overload. This allows a vehicle body to have a greater vertical height, and hence a greater volumetric capacity, than a body on a conventional suspension running on the same size and type of wheels and tires. In a conventionally sprung vehicle, the bed or floor must be high enough to maintain the necessary clearance over the wheels and axles under full load, and the top must be low enough to come within the maximum height regulations when the vehicle is unloaded.

In accordance with the patent statutes the principles of the present invention may be utilized in various ways, numerous modifications and alterations being contemplated, substitution of parts and changes in construction being resorted to as desired, it being understood that the apparatus shown in the drawings and described above is given merely for purposes of explanatioin and illustration without intending to limit the scope of the claims to the specific details disclosed.

What I claim and desire to secure by Letters Patent of the United States is:

1. A pneumatic cushion assembly for use between the frame and wheels of a vehicle comprising a plurality of elongated cord reinforced rubber cells disposed in superimposed relation with their long axes substantially parallel, each cell throughout substantially the entire length thereof having a width several times its height and a length several times its width, the cells each being of substantially uniform cross section substantially from end to end and the length of the cells being several times their aggregate height, top and bottom rigid members each substantially as long as the cells respectively bonded substantially throughout their lengths to the top and bottom cells for attachment of the assembly to the vehicle frame and wheels, and means for introducing fluid under pressure into the cells.

2. In a suspension system for a vehicle having a frame member extending in the direction of vehicle travel and an axle below and transverse thereto, a pneumatic cushion assembly for supporting the frame member on the axle, the assembly comprising a plurality of cord reinforced elongated rubber cells in parallel superimposed relation, each cell having a length several times its width, a rigid air box bonded to the bottom cell throughout substantially the entire length of the latter, means providing for flow of air between the cells and the air box, means for securing the air box to the axle, and a U shaped member bonded to the top cell throughout substantially the entire length of the latter to straddle the frame member and locate the assembly under the latter.

3. In a suspension system for a vehicle having a frame member extending in the direction of vehicle travel and an axle below and transverse thereto, a pneumatic cushion assembly for supporting the frame member on the axle, the assembly comprising a plurality of cord reinforced elongated rubber cells in parallel superimposed relation, a rigid air box bonded to the bottom cell, means providing for flow of air between the cells and the air box, means for securing the air box to the axle, a U shaped member bonded to the top cell to straddle the frame member and locate the assembly under the latter, and stabilizing members adjustably mounted on the air box and the U member, said stabilizing members being engageable against the cells and movable relative to the air box and the U member for distorting the air cells.

4. In a suspension system for a vehicle having a frame member extending in the direction of vehicle travel and an axle below and transverse thereto, a pneumatic cushion assembly for supporting the frame member on the axle, the assembly comprising a plurality of cord reinforced elongated rubber cells in parallel superimposed relation, a rigid air box bonded to the bottom cell, means providing for flow of air between the cells and the air box, means for securing the air box to the axle, a U shaped channel having a web portion bonded to the top cell and upwardly directed flange portions, the channel embracing the frame member to locate the assembly thereunder, and elongated stabilizing bars adjustably mounted in generally parallel relation along the air box and the channel, said bars being engageable against the cells and movable relative to the air box and the channel for distorting the air cells.

5. In a suspension system for use between the frame structure of a vehicle and tandem pairs of wheels, a pair of parallel axles mounting the wheels, rigid members extending between the axles in spaced relation with respect to one another and in underlying relation to the frame, each of said rigid members being attached at its opposite ends to said axles, elongated deformable air cushions interposed between the rigid members and the vehicle frame, said cushions being positioned on the tops of the rigid members with the long axes of the cushions extending in the direction of normal vehicle travel, arms rigidly connected to the axles and extending forwardly therefrom in the direction of normal vehicle travel, and rigid means pivotally connecting the forward end of each of the arms to the vehicle frame.

6. A multi-wheel road vehicle comprising a frame, tandem wheel shafts, wheels on the shafts, a suspension at each side of the frame for supporting the latter upon the shafts, each suspension comprising a rigid beam member resiliently connected at its ends to the shafts, a pneumatic cushion connected to and engaging said rigid member and interposed between the rigid beam member and the vehicle frame, tie means connected between the vehicle frame and a point of the rigid beam intermediate the axles, said tie means being substantially inextensible to limit separation of the rigid beam from the vehicle frame while permitting rocking of such beam about the connection point, and members extending forwardly from the axles and connected at their ends to the vehicle frame at points substantially midway between the vehicle frame sides, the end connections of the forwardly extending members including joints permitting vertical swinging of such members.

7. In a suspension system for a vehicle having a frame structure, an elongated frame member spaced below the frame structure, an elongated inflatable cushion interposed between the frame structure of the vehicle and the elongated frame member, said cushion comprising a plurality of superposed cord reinforced cells, and stabilizing bars adjustably mounted on the vehicle frame structure and the elongated frame member for movement toward and away from one another, the stabilizing bars being engageable with the inflatable cushion to deform the latter and thereby shift it laterally relative to the vehicle frame structure and the frame member.

8. In a suspension system for use between the frame structure of a vehicle and tandem pairs of wheels, spaced axles for the wheels, a rigid side frame member extending between and attached at its ends to the axles in underlying relation to the frame structure of the vehicle, an elongated inflatable cushion interposed between the side frame member and the vehicle frame structure, means for controlling the flow of fluid into and out of the cushion, and means connecting one end of the side frame member to the vehicle frame structure to resist separation of each end of said side frame member and the axle attached thereto from said frame structure whereby inflation of the cushion separates the vehicle frame structure and the side frame member at the other end of the latter, said connecting means including a separable connection for facile release of said one end of the side frame member.

9. In a suspension system for a vehicle having a frame structure, a pair of spaced axles for mounting wheels in tandem, wheels on the axles, a side member extending between the axles and attached thereto, an inflatable cushion interposed between the side member and the vehicle frame structure and having flexible side and end walls, said cushion being elongated in the direction of vehicle travel and having a length at least equivalent to the distance between the axles, means having readily separable parts for connection between each end of the side member and the frame structure, each said connector means being substantially inextensible and adapted upon connection of the parts thereof at one end of the side member to limit separation of the end of the side member to which it is connected and the adjacent attached axle from the frame structure at said one end while permitting separation of the other end of the side member from the frame structure by the cushion inflation, and means for controlling inflation and deflation of the cushion.

10. In a suspension system for a vehicle having a frame structure, a pair of spaced axles for mounting wheels in tandem, wheels on the axles, a side member extending between the axles and attached thereto at its opposite ends, an inflatable cushion interposed between the side member and the vehicle frame structure and having its opposite end portions connected to said side member, said cushion being elongated in the direction of vehicle travel and having a length at least equivalent to the distance between the axles, tie means extending between the frame structure and a point of the side member intermdiate the axles and the end portions of said cushion and being substantially inextensible to limit separation of the side member from the frame structure at such point, means having readily separable parts for connection between each end of the side member and the frame structure, each said connector means being substantially inextensible and adapted upon connection of the parts thereof at one end of the side member to limit separation of the end of the side member to which it is connected and the adjacent attached axle from the frame structure at said one end while permitting separation of the other end of the side member from the frame structure within the limit of the tie means as determined by the cushion inflation, and means for controlling inflation and deflation of the cushion.

11. In a suspension system for a vehicle having a frame structure, a pair of spaced axles for mounting wheels in tandem, wheels on the axles, side members extending between and connected at their ends to the axles and disposed in spaced generally parallel relation, inflatable cushions interposed between the side members and the vehicle frame structure, said cushions each being elongated in the direction of vehicle travel and having a length at least equivalent to the distance between the axles, means at corresponding ends of the side members for connecting such ends to the frame structure, said connecting means including readily separable quick disconnect parts for optional connection of one, both, or neither of such ends and being substantially inextensible to limit separation of a connected side member end and its attached axle from the frame structure, and means for controlling inflation and deflation of the cushions.

12. In a vehicle suspension, a hollow longitudinal walking beam, means for mounting an axle on each end of said beam, means intermediate the ends of said beam for securing a tension link to provide a fulcrum point for rocking movements of the beam, an elongated pneumatic cushion assembly extending along said beam and secured on its under side to the top side of the beam, said cushion assembly including side and end walls which flex to permit rocking movements of the beam and having portions mounted on the end portions of said beam on opposite sides of said fulcrum point, an air chamber in said beam in communication with said cushion assembly, and a rigid elongated member secured to the upper side of said pneumatic cushion assembly in parallel relation with said beam for attachment to a longitudinal frame member of the vehicle, the cushion assembly being in bearing engagement with both the walking beam and the rigid elongated member throughout substantially the entire length of such cushion assembly.

13. In a vehicle suspension, a pair of longitudinal walking beams, one on each side of the vehicle, elongated cushion elements on said beams to support the vehicle, the cushion elements having their long axes generally parallel to the long axes of the respective walking beams and being in bearing relation throughout substantially their entire length to both the vehicle and the walking beams, tension links connecting said beams with the vehicle, axles rotatively mounted on said beams to accommodate independent rocking movements of the two beams, and cooperating abutment means on said beams and axles limiting the rotation of the axles relative to the beams to resist brake torque reactions on the axles.

14. In a vehicle suspension, an axle carrying walking beam having a fulcrum point for rocking movement, an elongated cushion element extending along said beam to support the vehicle, the cushion element having its long axis generally parallel to the long axis of the walking beam and being in bearing relation throughout substantially its entire length to both the vehicle and the beam, tension links attached to said beam at said fulcrum point and intermediate the ends of the cushion to limit the separation of said fulcrum point from the vehicle, each end of said walking beam being movable a substantial distance upwardly and downwardly relative to the vehicle while said tension links are under tension and said fulcrum point is in its lowermost position relative to the vehicle, and a tie link for temporarily connecting one end of said beam to the vehicle to restrain said rocking movement about said fulcrum point.

15. A running gear structure for the rear wheels of a road vehicle having a chassis frame and axle means spaced below the frame for mounting the wheels, said structure comprising in combination with said chassis and axle means an elongated rigid walking beam having opposite end portions connected to said axle means at spaced points, cushion means interposed between the vehicle chassis frame and both ends of the walking beam yieldingly to support the vehicle chassis on the beam while permitting substantial vertical movement of either end of said beam with respect to said frame, said cushion means having upright walls which flex to permit vertical rocking movements of said walking beam relative to said chassis frame, and tension link means extending between the chassis frame and a point intermediate the cushioned ends of the walking beam to constitute such point a fulcrum about which the walking beam may tilt relative to the chassis frame.

16. A running gear structure for the rear wheels of a road vehicle having a chassis frame and axle means spaced below the frame for mounting the wheels, said structure comprising in combination with said chassis and axle means an elongated rigid walking beam having opposite end portions connected to said axle means, pneumatic cushion means interposed between the vehicle chassis frame and both ends of the walking beam, said cushion means having side and end walls which flex to permit rocking movements of said walking beam relative to said chassis frame, said cushion means being arranged for flow of inflating air longitudinally of the beam to accommodate tilting of the beam relative to the chassis frame and substantial vertical movement of either end of said beam relative to said frame, and tension link means extending between the chassis frame and a point of the walking beam intermediate the cushioned ends of the latter to constitute such point a tilting fulcrum when such point is at its lowermost position relative to the chassis frame as determined by said link means.

17. A running gear structure for the rear wheels of a road vehicle having a chassis frame and axle means spaced below the frame for mounting the wheels, said structure comprising an elongated box beam having an internal fluid chamber, pneumatic cushion means attached at its opposite ends to the box beam and interposed between the vehicle chassis frame and both ends of the box beam, said cushion means having side and end walls which flex to permit vertical rocking movements of said beam relative to the chassis frame, said cushion means being connected to the fluid chamber of the beam for flow of fluid therebetween and being arranged for flow of fluid longitudinally relative to the beam to accommodate tilting of the beam relative to the chassis, and tension link means between the chassis frame and the beam, said link means being connected to the beam at a point intermediate the cushioned ends of the beam for tilting of the beam about such point both ends of said box beam being movable a substantial distance toward and away from said chassis frame when said link means is under tension and said fulcrum point is a maximum distance away from said chassis frame.

18. A running gear structure for the rear wheels of a road vehicle having a chassis frame and axle means spaced below the frame for mounting the wheels, said structure comprising in combination with said chassis and axle means an elongated rigid walking beam connected at spaced points to said spaced axle means, each end of said beam being movable a substantial distance vertically with respect to said frame, a multicell pneumatic cushion interposed between the vehicle chassis frame and the walking beam and having flexible side and end walls, said cushion extending substantially from end to end of the beam and being in bearing relation at both its ends to both the chassis frame and the walking beam, means providing for fluid flow between the cells of the cushion, and tension link means between the chassis frame and the beam, said link means being connected to the beam at a point between said spaced points and intermediate the cushioned ends of the beam for tilting of the beam about such point.

19. A running gear structure for the rear wheels of a road vehicle having a chassis frame and axle means spaced below the frame for mounting the wheels, said structure comprising in combination with said chassis and axle means an elongated rigid walking beam having opposite end portions connected to said axle means at spaced points, cushion means interposed between the vehicle chassis frame and both ends of the walking beam yieldingly to support the vehicle chassis on the beam while permitting substantial vertical movement of either end of said beam with respect to said frame, and a pair of tension links connected between the chassis frame and the walking beam and disposed one on each side of the beam, said links being connected to the beam at a point intermediate the cushioned ends of the beam for tilting of the beam about such point, each end of said walking beam being free to move a substantial distance toward and away from said chassis frame while said links are under tension and said point is at its lowermost position relative to said chassis frame.

20. A running gear structure for the rear wheels of a road vehicle having a chassis frame and axle means spaced below the frame for mounting the wheels, said structure comprising in combination with said chassis and axle means a pair of horizontally spaced walking beams each having opposite end portions connected to said axle means, cushion means interposed between the chassis frame and both ends of each of the beams yieldingly to support the vehicle chassis on the beams while permitting substantial vertical movement of either end of said beam with respect to said frame, and tension link means extending between the chassis frame and points of the walking beams located intermediate the cushioned ends of the beams to constitute such points fulcrums for tilting of the beams relative to the chassis frame when said link means are under tension.

21. A running gear structure for the rear wheels of a road vehicle having a chassis frame and axle means spaced below the frame for mounting the wheels, said structure comprising in combination with said chassis and axle means a pair of horizontally spaced walking beams, cushion means interposed between the chassis frame and both ends of each of the beams yieldingly to support the vehicle chassis on the beams, tension link means extending between the chassis frame and points of the walking beams located intermediate the cushioned ends of the beams to constitute such points fulcrums for tilting of the beams relative to the chassis frame, and means yieldingly connecting spaced points of each walking beam to the axle means constraining the walking beams to movements substantially in unison and permitting limited differential movements of the beams under stress.

22. A running gear structure for the rear wheels of a road vehicle having a chassis frame and axle means spaced below the frame for mounting the wheels, said structure comprising in combination with said chassis and axle means an elongated rigid walking beam, cushion means interposed between the vehicle chassis frame and both ends of the walking beam yieldingly to support the vehicle chassis on the beam, tension link means extending between the chassis frame and a point intermediate the cushioned ends of the walking beam to constitute such point a fulcrum for tilting of the walking beam relative to the chassis frame, each end of said beam being free to move a substantial distance toward and away from said chassis frame while said fulcrum point is in its lowermost position relative to said chassis frame and said link means is under tension, a drag bar extending forwardly from the axle means in the direction of vehicle travel, and means coupling the forward end of the drag bar to the chassis frame for up and down movement and for twisting movement about an axis which extends generally in said direction.

23. A running gear structure for the rear wheels of a road vehicle having a frame that includes horizontally spaced chassis members and axle means spaced below such members for mounting the wheels, said structure comprising in combination with said members and axle means a pair of horizontally spaced walking beams each secured to the axle means at spaced points, pneumatic cushions interposed between the chassis members and the beams, each cushion comprising a plurality of cells and being of greater length than the distance between the securement points of the beams and axle means, each of said cushions being in bearing relation at both its ends to both a chassis member and an end portion of one of the walking beams and tension link means connected between the vehicle frame and the beams to limit separation of the beams from the chassis members, said link means being attached to the beams at points intermediate the axle securement points of each beam for beam tilting movements relative to the vehicle frame about the link attachment points as fulcrums.

24. In combination in a vehicle having a frame structure, a running gear comprising an axle and wheels thereon mounted for rotation in spaced generally parallel planes, an inflated cushion interposed between an end portion of the axle and the vehicle frame structure, said cushion being elongated in the direction of normal vehicle travel and extending both forwardly and rearwardly of the axle, and having flexible side and end walls lever means spaced from said cushion secured to the axle and extending forward therefrom in the direction of normal vehicle travel, means connecting the forward end of the lever means to the frame structure, said connecting means including a yielding joint permitting limited up and down and twisting movement of the lever means about axes crossing one another substantially midway between the planes of the wheels, and substantially inextensible means connected between the frame structure and the axle to limit separation thereof.

25. In a suspension system for a vehicle having a frame structure, a pair of spaced axles for mounting wheels in tandem, wheels on the axles, side members extending between and attached at their ends to the axles and disposed in spaced generally parallel relation, inflatable cushions interposed between the side members and the vehicle frame structure and having flexible side and end walls, said cushions being effective to exert separating pressure between the ends of the side members and the vehicle frame structure in the regions of the junctures between the side members and the axles, means at corresponding ends of the side members for connecting such ends to the frame structure, said connecting means including readily separable quick disconnect parts for optional connection of one, both or neither of such ends and being substantially inextensible to limit separation of a connected side member end and the adjacent attached axle from the frame structure, and means for controlling inflation and deflation of the cushions.

26. A pneumatic cushion assembly for use between the frame and wheels of a vehicle comprising a plurality of elongated cord reinforced rubber cells disposed in superimposed relation with their long axes substantially parallel, each cell being laterally unconfined and having a width several times its height and a length several times its width, the cells each being of substantially uniform cross section substantially from end to end and the length of the cells being several times their aggregate height, elongated rigid members bonded to the top and bottom cells throughout substantially the entire length of the latter for attachment of the assembly to the vehicle frame and wheels, and means for introducing fluid under pressure into the cells.

27. In a suspension system for a vehicle having a frame member extending in the direction of vehicle travel and an axle below and transverse thereto, a pneumatic cushion assembly for supporting the frame member on the axle, the assembly comprising a plurality of cord reinforced elongated rubber cells in parallel superimposed relation, each cell having a length several times its width, a rigid air box bonded to the bottom cell, means providing for flow of air between the cells and the air box, means for securing the air box to the axle, and a U-shaped channel having a web portion extending in the direction of vehicle travel and bonded to the top cell and having upwardly directed flange portions, the channel embracing the frame member to locate the assembly thereunder.

28. A pneumatic cushion assembly for use between the frame and wheels of a vehicle comprising a plurality of elongated cord reinforced rubber cells disposed in superimposed relation with their long axes substantially parallel, each cell being laterally unconfined and having a width several times its height and a length several times its width, the cells each being of substantially uniform cross section substantially from end to end and the length of the cells being several times their aggregate height, rigid members each several times greater in length than in width secured to the top and bottom cells, said cells and rigid members being substantially coextensive in length and arranged so that the several cells are compressed between the rigid members when the assembly is loaded in use and means for introducing fluid under pressure into the cells.

29. In a vehicle suspension system, an elongated deformable cushion comprising a plurality of superposed elongated cells each formed of cord reinforced rubber material and each of several times greater length than width, means connecting the cells for the flow of air therebetween, an elongated rigid air box having its top side bonded to the bottom cell and including an internal chamber in communication with the bottom cell, and a rigid elongated attaching member bonded to the top cell and disposed in the plane of the elongated box, the bonds between the cells and the rigid air box and the rigid attaching member each extending substantially the entire length of the respective cells.

30. A multiple wheel truck for supporting a vehicle chassis comprising a pair of axles and wheels on the axles, a pair of spaced rigid side members each extending between and connected to the axles to retain the latter in generally parallel relation, the connections of the side members to the axles including yieldable means providing limited universal tilting and limited rotative movement of each axle relative to each side member, pneumatic cushions carried by the side members for mounting the vhicle chassis, said cushions providing support for the chassis distributed along the lengths of the side members and yieldingly resisting rocking of the side members relative to the chassis and means connecting the axles to the chassis for limited tilting and for limited turning about their longitudinal axes while restraining the axles against endwise movements.

31. In a suspension system for a vehicle having a frame structure, a pair of spaced parallel axles, spaced wheels on each of the axles and on opposite sides of the frame structure, frame members connecting the axles and disposed in spaced relation, an elongated deformable cushion disposed between an end portion of each frame member and the vehicle frame structure to support the latter on the frame members while permitting substantial vertical movement of the ends of each frame member with respect to said structure, and substantially inextensible means connected between the vehicle frame structure and each of the frame members solely at points of the latter intermediate the axles to permit rocking of the frame members relative to the vehicle frame structure accompanied by deformation of the cushions nonuniformly along their lengths while maintaining each of said frame members at each of said points of connection at a substantially constant predetermined vertical distance from the vehicle frame structure.

32. In a vehicle suspension, a hollow longitudinal walking beam mounted for limited universal movement relative to the vehicle, means for securing an axle to said beam, an elongated pneumatic cushion assembly extending along said beam and secured along substantially the full length of its under side to the top side of the beam, an air chamber in said beam in communication with said cushion assembly, and a rigid elongated channel member secured to the upper side of said pneumatic cushion assembly along substantially the full length of the latter and in parallel relation with said beam, said channel member having an upwardly opening channel to receive and spaced side flanges to embrace and for attachment to a longitudinal frame member of the vehicle.

33. In a system for mounting the frame of a vehicle on the wheels thereof, a pair of spaced walking beams, axle means at each end of each walking beam, a pair of normally leading wheels on the axle means at one set of corresponding ends of the walking beams, a pair of normally trailing wheels on the axle means at another set of corresponding ends of the walking beams, pneumatic cushion means distributed along the length of each walking beam and interposed in bearing relation between the ends of each such beam and the vehicle frame yieldingly to support the frame on the walking beams while permitting substantial vertical movement of the ends of each beam relative to the frame, and substantially inextensible tie means connected and tensioned between the vehicle frame and each of the walking beams, the tie means being connected to each walking beam only along a single line transverse to such walking beam, said transverse lines each being located intermediate the axle means mounting the leading and trailing wheels of such walking beam to permit rocking of the beam while the tie is maintained under tension and while the distributed cushion means yieldingly restrains such rocking, each end of each of said walking beams being movable a substantial distance toward and away from said frame while said transverse lines are maintained in their lowermost positions relative to said frame.

34. In a suspension system for a vehicle having a chassis frame extending in the direction of vehicle travel and a pair of spaced parallel axles below and transverse thereto for mounting wheels in tandem, the improvement which comprises: a tiltable rigid longitudinal walking beam extending between said spaced axles, each end of said walking beam being connected to one of said axles and being movable a substantial distance vertically with respect to the vehicle frame, cushion means connected to and interposed between the vehicle chassis frame and both ends of the walking beam yieldingly to support the vehicle chassis on the beam during vertical movement of said ends, substantially inextensible vertical tension link means attached to the walking beam and to the chassis frame to prevent movement of said beam away from said frame, said tension link means extending between the chassis frame and a point intermediate said spaced axles to constitute such point a fulcrum about which the walking beam may tilt with respect to the chassis frame and to limit the spacing of said fulcrum point from the chassis frame, each end of said walking beam being movable a substantial distance toward and away from said chassis frame while said tension link means is under tension and such point is at its lowermost position relative to said frame.

35. A running gear structure for the rear wheels of a road vehicle having a chassis frame, spaced axles below the frame and extending laterally thereacross, and tandem pairs of wheels mounted on opposite ends of said axles at opposite sides of the frame, said structure comprising a pair of parallel longitudinally elongated rigid walking beams on opposite sides of the vehicle connecting said spaced axles, an elongated inflatable cushion element having opposite end portions engaging each of the beams to support the vehicle, said cushion elements having side and end walls which flex to permit vertical rocking movements of said walking beams, and combined radius and torque arms on said axles resiliently connected with the chassis frame, each of said arms being connected to an axle between the walking beams.

36. A running gear structure for the rear wheels of a road vehicle having a chassis frame, comprising a plurality of cushion means, an axle and beam assembly, a combined radius and torque arm unit, and a plurality of tension link units, said axle and beam assembly comprising an axle secured near its ends to a pair of elongated rigid beams extending longitudinally of the vehicle, said cushion means being interposed between the vehicle chassis and both ends of said beams yieldingly to support the vehicle chassis on said axle and beam assembly, said tension link units extending between said chassis frame and points on said axle and beam assembly intermediate the cushioned ends of said beams, said beams being mounted for substantial vertical rocking movements relative to said chassis frame while said link units are under tension, and said radius and torque arm unit extending forwardly from said axle in the direction of vehicle travel and coupled at its forward end to said chassis frame for up and down movement and for twisting movement about an axis which extends generally in said direction.

37. In a suspension system for a vehicle having a frame structure, a pair of spaced parallel axles extending between opposite sides of the frame structure, spaced wheels on each of the axles and on opposite sides of the vehicle frame structure, frame members at opposite sides of the vehicle frame structure connecting the axles and disposed in spaced relation, a deformable cushion elongated in the direction of vehicle travel and disposed between the end portions of each frame member and the vehicle frame structure, and flexible cables connected to the frame structure and to points of the frame members located between said end portions and intermediate the axles to limit separation of the frame members from the frame structure while permitting tilting of such members relative to such structure, the opposite ends of each of said frame members being mounted to move a substantial distance toward and away from said frame structure while said cables are under tension and said points are in their lowermost positions relative to said frame structure.

38. In a vehicle suspension, a pair of parallel longitudinal walking beams, one on each side of the vehicle, a longitudinally elongated cushion element on each of said beams extending the length of the beam to support the vehicle, each cushion element having opposite end portions engaging the beam and being in supporting relation to the vehicle substantially throughout the length of the cushion element, a pair of parallel transverse axles mounted on the opposite ends of said beams for vertical movements therewith with respect to the vehicle, a fulcrum point on each beam between said axles and between the end portions of each cushion element, and tension links attached to said beams at said fulcrum points securing said beams to the vehicle for rocking movement about said fulcrum points.

39. In a vehicle suspension, a pair of longitudinal walking beams, one on each side of the vehicle, wheel carrying axles mounted on the opposite end portions of said beams, an elongated cushion element on each beam and in bearing relation at both of its ends to both the vehicle and the beam, each cushion element having a length several times its width and having its one axis generally parallel to the long axes of the walking beams, flexible tension links, each connecting said vehicle with a fulcrum point between said ends and between said axles for relative universal movement, the opposite ends of each of said beams being mounted for movement a substantial distance vertically toward and away from said vehicle while said links are under tension and said fulcrum points are in their lowermost positions relative to said vehicle, and combined radius and torque arms on said axles resiliently connected with the vehicle.

40. A running gear structure for the rear wheels of a road vehicle having a frame that includes laterally spaced chassis members and axle means spaced below such members for mounting the wheels, said structure comprising in combination with said members and axle means a pair of laterally spaced walking beams secured at spaced points to the end portions of the axle means, longitudinally elongated pneumatic cushions interposed between the chassis members and the ends of the beams, the cushions for each of said beams having side and end walls which flex to permit vertical rocking movements of said walking beams relative to said chassis members and having a total length greater than the distance between the securement points of the beams and axle means, and inextensible tension members connected between the vehicle frame and the beams to limit separation of the beams from the chassis frame while permitting vertical rocking movements of said beams, and means including a drag bar extending forwardly from the axle means in the direction of vehicle travel for connecting the axle means to the vehicle, said drag bar being coupled at its forward end to the vehicle frame for up and down movement and for twisting movement about an axis which extends generally in said direction.

References Cited in the file of this patent

UNITED STATES PATENTS

| | | |
|---|---|---|
| 1,130,656 | Annable | Mar. 2, 1915 |
| 1,445,486 | Cats | Feb. 13, 1923 |
| 1,595,233 | Kriegbaum | Aug. 10, 1926 |
| 1,739,450 | Fageol | Dec. 10, 1929 |
| 1,969,490 | Wesemeyer | Aug. 7, 1934 |
| 2,056,106 | Kuhn | Sept. 29, 1936 |
| 2,093,089 | Maki | Sept. 14, 1937 |
| 2,103,381 | Perkins et al. | Dec. 28, 1937 |
| 2,180,876 | Kuhn | Nov. 21, 1939 |
| 2,193,567 | Pointer | Mar. 12, 1940 |
| 2,196,954 | Branstrator | Apr. 9, 1940 |
| 2,204,087 | Konetsky | June 11, 1940 |
| 2,226,605 | Geyer et al. | Dec. 31, 1940 |
| 2,290,620 | Brown | July 21, 1942 |
| 2,493,024 | Pointer | Jan. 3, 1950 |
| 2,537,637 | Candlin | Jan. 9, 1951 |
| 2,624,594 | Gouirand | Jan. 6, 1953 |
| 2,663,569 | Gouirand | Dec. 22, 1953 |

FOREIGN PATENTS

| | | |
|---|---|---|
| 664,414 | France | Apr. 23, 1929 |
| 253,787 | Great Britain | June 24, 1926 |
| 534,793 | Great Britain | Mar. 18, 1941 |